Patented July 21, 1953

2,646,373

UNITED STATES PATENT OFFICE 2,646,373

TREATMENT OF PAPERMAKING FIBERS WITH ORGANOSILICON COMPOUNDS

Clinton W. MacMullen, Fayetteville, and Richard C. Shaver and Robert L. Titus, Syracuse, N. Y., assignors to Cowles Chemical Company, Cleveland, Ohio, a corporation of Ohio No Drawing. Application January 20, 1950, Serial No. 139,788

5 Claims. (Cl. 117—155)

This invention relates to paper making and more particularly to a method of applying an organosilicon compound to paper-making fibers, either before or after they are formed into paper, to improve the wet strength and resistance to ink penetration of paper made of the treated fibers.

Untreated paper-making fibers are highly absorbent and in order to improve the resistance to ink penetration of paper made from the fibers, it has been customary for many years to apply a sizing composition thereto. The size is usually applied to the fibers prior to their formation into paper, e. g., in the beater in the form of an emulsion or dispersion. Many different types of natural and synthetic resins have been used for this purpose.

It has been previously recognized that the silicone resins possess properties that render them potentially very useful as a paper size, but so far as we are aware, none of the prior proposals for utilizing silicone resins as paper sizes has been completely successful in a practical commercial sense. Thus it has been proposed that silicone resins dissolved in organic solvents be added to the fibers in the beater for sizing purposes, but the use of organic solvents is objectionable both from the point of view of expense and from the point of view of fire hazard. Moreover, the prior processes have required curing at excessively high temperatures in order to secure an appreciable sizing effect.

It is accordingly, an object of the present invention to provide an improved method of applying an insoluble organosilicon compound to paper-making fibers. It is another object of the invention to provide a method of depositing an organosilicon compound on paper-making fibers from an aqueous solution. It is still another object of the invention to provide a method of sizing paper with organosilicon compounds wherein curing can be effected at a temperature no higher than that normally used in the paper-making process. Other objects of the invention will be in part obvious and in part pointed out hereafter.

In one of its broader aspects, the method of invention comprises impregnating paper-making fibers, either prior to or after they have been formed into a sheet of paper, with an aqueous solution of the alkaline hydrolysis products of an organo-trihalosilane, adjusting the pH of the impregnated fibers to cause an insoluble organosilicon compound to be deposited therein and curing the impregnated fibers at an elevated temperature to complete polymerization of the deposited compound. Aqueous solutions suitable for use in treating paper-making fibers in accordance with the present method are disclosed in copending applications of Clinton W. MacMullen, Serial Nos. 782,683, now abandoned, and 68,750, now Patent No. 2,587,636, filed October 28, 1947, and December 31, 1948, respectively. In general, the solutions are prepared by causing an organo-trihalosilane dissolved in a suitable medium, such as petroleum ether, to react with an aqueous alkali, and maintaining the concentration of alkali at sufficiently high value to provide a stable solution of the alkaline hydrolysis products of the organo-trihalosilane. The solutions of the organosilicon compounds thus prepared exhibit excellent wetting properties and hence rapidly penetrate the fibers to be impregnated. Also such aqueous solutions are more convenient for use in treating the fibers than are organic solvent solutions.

In a somewhat narrower aspect the method of the invention comprises acidifying a paper furnish comprising a water suspension of paper-making fibers, adding thereto an alkaline solution of the soluble organosilicon compound and agitating the mixture and thereafter raising the pH of the mixture to about 10.5–11.0 to cause an insoluble organosilicon compound to be deposited in the fibers. The pulp mixture is preferably heated say to about 60° C. with stirring to effect the desired deposition of the organosilicon compound. Thereafter, an aqueous solution of a salt of a metal selected from the group consisting of aluminum, ferric iron and cupric copper is added to and mixed with the pulp and the pH of the pulp adjusted to 6.0–6.4. The pulp is allowed to stand at room temperature for six hours or longer, after which it is diluted, the pH further adjusted if necessary to a value of about 6, and the pulp formed into paper in the usual manner. The use of the second treating solution is not essential but has been found particularly desirable in reducing the temperature at which curing can be carried out. The effectiveness of the second treating solution in this respect is more particularly pointed out hereafter. Best results have been obtained when using alum solutions for this second treatment.

The nature of the organic radical in the organosilicon compound affects the degree of water resistance as measured by the ink float test and water absorption test, and also affects the curing temperature necessary to complete polymerization of the organosilicon compound. Good results have been obtained where the organosilicon compound contains an organic radical which is a mixed amyl, n-butyl or benzyl group. As more particularly pointed out hereafter, a mixture of the n-butyl and mixed amyl derivatives produces particularly desirable results.

The amount of insoluble organosilicon compounds deposited in the fibers varies with the concentration of the organosilicon compound as well as with time, temperature and pH. Deposition may be effected under suitable conditions over a fairly wide range of pH values, but at the high dilutions customary in paper-making best results have been obtained at a pH of about 10.5–11.0. The interrelationship between these variables is indicated in the specific examples given below.

In order to point out more fully the nature of the present invention, the following specific examples are given to illustrate the application to paper-making fibers of compounds falling within the scope of the invention and the manner in which they may be applied. It is to be understood that the following examples are illustrative only and it will be apparent to those skilled in the art that numerous other compounds, as described in the copending MacMullen applications referred to above, may be applied and that the illustrative methods described below may be modified in various ways to adapt to particular uses the present method and products produced thereby.

EXAMPLE 1

A mixture of 10 grams of air-dry soda pulp in 400 cc. of water (2.45% consistency) was prepared and 25 cc. of an aqueous alkaline solution containing 4.77% by weight of sodium hydroxide and 3.63% by weight of the sodium salts of the alkaline hydrolysis products of n-butyl trichlorosilane was added thereto. After agitating the mixture for five minutes, 10% sulfuric acid was added in sufficient quantity to bring the pH of the mixture down to 10.5–11.0 and the agitation continued for fifteen minutes. The pulp mixture was allowed to stand for three hours and then diluted to 4000 cc. with water and the pH adjusted to 4.5–4.8 with 10% sulfuric acid.

Hand sheets were then formed by taking 1000 cc. portions of the well-stirred pulp suspension and allowing the water to drain out of a mat of fibers formed on a 6″ diameter, 100-mesh wire screen. The mat thus formed was removed from the screen and pressed between blotters at a pressure of 8000 pounds gage on a Carver hydraulic press. The resulting sheets were removed from between the blotters, allowed to air dry and then cured by heating in an oven at 160° C. for one hour.

After cooling and conditioning at room temperature the sheets were tested for time of ink penetration and water absorption. At room temperature the ink penetration time for sheets prepared as described above was of the order of ninety minutes whereas for similarly formed untreated sheets ink penetration was substantially instantaneous. Water absorption of test specimens submerged in 1″ of distilled water at room temperature for fifteen minutes was 26.5% of the original dry weight of the specimen as compared to 99–100% for a similarly formed untreated sheet.

The wet sheets exhibited greater wet strength than similarly formed untreated sheets.

EXAMPLE 2

10 grams of air-dry bleached sulfite pulp was disintegrated in 425 cc. of an aqueous alkaline solution containing 7.6% by weight of sodium hydroxide and 4.2% by weight of the sodium salts of the alkaline hydrolysis products of n-butyl trichlorosilane and the agitation continued fifteen minutes. The excess liquor was then drained from the pulp mass with suction, leaving 46 grams (about 44 cc.) of liquor in the pulp mass. The wet pulp was allowed to stand one-half hour and then was disintegrated in 425 cc. of water. The pH of the pulp mixture was brought down to 10.5–11.0 with 10% sulfuric acid to cause precipitation of an insoluble organosilicon compound and the mixture allowed to stand three hours. The pulp mixture was then diluted to 4000 cc. with water and the pH adjusted to 4.5–4.8 with 10% sulfuric acid.

Hand sheets were then formed from this mixture as described in Example 1. After cooling and conditioning at room temperature, the sheets were tested for water resistance by floating specimen squares on distilled water at room temperature. The test specimens withstood water penetration for a period of forty-eight hours as compared to practically instantaneous penetration of similarly formed sheets of untreated pulp.

EXAMPLE 3

Squares of filter paper 3″ x 3″ were cut from S Hexagon brand filter paper and immersed for four minutes in an aqueous solution containing 7% by weight of sodium hydroxide and 4.3% by weight of the sodium salts of the alkaline hydrolysis products of n-butyl trichlorosilane. The impregnated papers were immersed in dilute caustic solution, the pH adjusted to 10.5 with sulfuric acid, and the samples soaked for five minutes. The paper squares were then removed, freed of excess solution between blotting papers, and dried in an oven at 155–160° C. for five minutes. Water repellency was indicated by the fact that a drop of water placed on a treated square failed to penetrate to the under side over night, whereas penetration was instant for an untreated paper.

EXAMPLE 4

Coarse qualitative grade filter papers were immersed for forty minutes in an aqueous alkaline solution containing about 7% by weight NaOH and 4% by weight of the sodium salts of the alkaline hydrolysis products of n-butyl trichlorosilane. The impregnated filter papers were then immersed for 10 minutes in tap water and air dried at room temperature over night. Drops of water failed to penetrate these samples whereas similar untreated samples were rapidly penetrated by drops of water.

EXAMPLE 5

25 cc. of an aqueous alkaline solution containing 7.1% by weight of sodium hydroxide and 4.52% by weight of the sodium salts of the alkaline hydrolysis products of n-butyl trichlorosilane were mixed with 400 cc. of tap water and the pH of the solution brought down to 4.5–4.8 with 10% sulfuric acid. 10 grams of air-dry bleached sulfite pulp were then disintegrated in the solution and agitated fifteen minutes. After allowing the mixture to stand an additional fifteen minutes without agitation, the pH of the pulp mixture was raised to 10.5–11.0 with 5% aqueous sodium hydroxide and the pulp mixture allowed to stand three hours. The pulp mixture was then diluted to 4000 cc. and the pH adjusted to 4.5–4.8 with 10% sulfuric acid.

Hand sheets were then formed and cured as in Example 1. After cooling and conditioning at room temperature, the sheets were tested for ink penetration and gave values on the order of 120–140 minutes as compared to instantaneous penetration of similarly formed, untreated sheets. The water absorption of test specimens submerged 1″ in distilled water at room temperature for fifteen minutes was 34% of the original weight of the sheet as compared to 98–100% for an untreated sheet. The wet sheets exhibited greater wet strength than similar untreated sheets.

EXAMPLE 6

10 grams of air-dry bleached sulfite pulp was disintegrated in 400 cc. of water (2.5% consistency). 59 cc. of an aqueous alkaline solution containing 10.61% by weight of potassium hydroxide and 2.64% by weight of the potassium salts of the alkaline hydrolysis products of mixed amyl trichlorosilane was added to the pulp suspension and the mixture agitated. After agitating the mixture five minutes, 10% aqueous sulfuric acid solution was added in sufficient quantity to bring the pH of the mixture down to 10.5–11.0. Agitation was continued at room temperature for fifteen minutes and then the mixture was allowed to stand over night (sixteen hours). The pulp mixture was then diluted to 4000 cc. with water and the pH of the suspension adjusted to 4.5–4.8 with dilute sulfuric acid.

Hand sheets were formed as in Example 1 except that curing was effected at 200° C. rather than 160° C. After cooling and conditioning at room temperature, the sheets were tested for time of ink penetration and water absorption. At room temperature the ink penetration time was of the order of nine hours as compared to practically instantaneous penetration of a similarly formed untreated pulp sheet. Water absorption of test specimens submerged in 1″ of distilled water at room temperature for fifteen minutes was 33% of the original dry weight of the specimen as compared to 99–100% for a similarly formed untreated pulp sheet.

The wet sheets exhibited greater wet strength than similarly formed untreated sheets.

EXAMPLE 7

10 grams of air-dry bleached sulfite pulp was disintegrated in 400 cc. of water (2.5% consistency). 38 cc. of an aqueous alkaline solution containing 11.12% potassium hydroxide and 3.95% potassium salts of the alkaline hydrolysis products of benzyl trichlorosilane was added to the pulp mixture and the mixture agitated. After agitating the mixture five minutes, 10% aqueous sulfuric acid solution was added in sufficient quantity to bring the pH of the mixture down to 10.5–11.0. Agitation was continued at room temperature for fifteen minutes and then allowed to stand over night (sixteen hours). The pulp mixture was then diluted to 4000 cc. with water and the pH of the suspension adjusted to 4.5–4.8 with dilute sulfuric acid.

Hand sheets formed and cured as in Example 6 were tested, after cooling and conditioning at room temperature, for time of ink penetration and water absorption. At room temperature the ink penetration time was of the order of sixty minutes as compared to practically instantaneous penetration of a similarly formed untreated pulp sheet. Water absorption of test specimens submerged in 1″ of distilled water at room temperature for fifteen minutes was 30% of the original dry weight of the specimen as compared to 99–100% for a similarly formed untreated pulp sheet.

The wet sheets exhibited greater wet strength than similarly formed untreated sheets.

EXAMPLE 8

The procedure of Example 6 was followed except that prior to addition of the organosilicon hydrolysis products the pulp was mixed with 92 cc. of 10% aqueous sulfuric acid. This amount of acid was sufficient to neutralize the alkalinity of the solution of alkaline hydrolysis products and produce a final pH of 4.5–4.8. The hydrolysis products were then added and after agitation for fifteen minutes, the pH of the pulp mixture was raised to 10.5–11.0 with a dilute alkali solution to effect precipitation. After five minutes further agitation, the pulp was allowed to stand over night (sixteen hours) and the further steps of Example 6 carried out.

Hand sheets of the thus treated pulp exhibited, at room temperature, an ink penetration time of the order of seven and one-half hours. The water absorption of the test specimen submerged in 1″ of distilled water at room temperature for fifteen minutes was 33%.

EXAMPLE 9

A pulp mixture containing 50 grams of air-dry bleached sulfite pulp in 2000 ml. of water (2.5% consistency), which had been beaten to a Canadian Freeness Test of 310, was acidified with 90 ml. of 2 N hydrochloric acid. This amount of acid was sufficient to neutralize the alkalinity of 100 ml. of aqueous alkaline solution containing 5.97% sodium hydroxide and 3.10% sodium salts of the alkaline hydrolysis products of mixed amyl trichlorosilanes which was subsequently added and to produce a final pH of 4.5–5.5. After the organisilicon solution had been added and well dispersed into the mixture, the pH of the mixture was raised to 10.5–11.0 with dilute alkali solution (5% sodium hydroxide). The mixture was heated with continuous agitation to 60° C. and then allowed to stand at room temperature over night.

The pulp mixture was then diluted to 50 liters (0.10% consistency) and the pH of the suspension of fibers adjusted to 4.6–4.8 with dilute acid (2 N hydrochloric). One liter portions of this pulp suspension were used to form sheets on a standard 6¼″ diameter test sheet mold. The wet sheets, backed on one side with a polished metal plate, and on the other side by a blotter, were pressed at 50 lbs. gage on a hydraulic press, the blotters removed, and the sheets allowed to air dry on the metal plates. After removal from the metal plates, three separate lots of the sheets were cured as follows:

Set A, 125° C. for one hour
Set B, 150° C. for one hour
Set C, 175° C. for thirty minutes The cured sheets were conditioned at 73° F. and 50% relative humidity and then subjected to wet strength tests. Tensile strength determinations were made on the dry sheets and also on samples of the same sheets after soaking in water for various intervals of time. The wet strength is calculated as the percentage of original tensile retained after the water treatment. The results of the tests are given in Table I.

*Table I*

| Sample | Time of Immersion | | | |
|---|---|---|---|---|
| | 5 Min. | 10 Min. | 15 Min. | 30 Min. |
| | Percent | Percent | Percent | Percent |
| Uncured Sheet | | | 3.3 | |
| Set A | 7.5 | | 7.0 | |
| Set B | 15.7 | 13.7 | 15.0 | 15.0 |
| Set C | 26.8 | 20.4 | 20.6 | 22.4 |

EXAMPLE 10

A pulp mixture containing 10 grams of air-dry bleached sulfite in 400 ml. of water (2.5% consistency), which had beaten to a Canadian Freeness Test of 300, was acidified with 21 ml. of 2 N hydrochloric acid. This amount of acid was sufficient to neutralize the alkalinity of 20 ml. of aqueous alkaline solution containing 6.81% sodium hydroxide and 3.0% sodium salts of the alkaline hydrolysis products of mixed amyl trichlorosilanes which was subsequently added and also to produce a final pH of 4.5–5.5. After the alkaline organisilicon solution had been added and well dispersed into the mixture, the pH was raised to 10.5–11.0 with dilute alkali solution (5% sodium hydroxide). The mixture was heated with continuous agitation to 60° C. and then allowed to stand at room temperature for at least four hours.

The pulp mixture was then diluted to 4000 ml. with tap water and 10 ml. of a 6.8% by weight solution of alum ($Al_2(SO_4)_3$) added. This quantity of alum was sufficient to give the pulp suspension a pH of 6.0–6.2, the optimum final pH for the formation of sheets.

Hand sheets were formed as in Example 1 and cured at various different temperatures for different periods of time by placing the sheet against a heated metal surface. The results of ink penetration and per cent water absorption tests on the cured sheets are given below in Tables II and III respectively.

*Table II*

| Time | Temperature, °C. | | |
|---|---|---|---|
| | 93 | 107 | 118 |
| 5 Min | 13 | 16 | 18 |
| 10 Min | 17 | 20 | 22 |
| 15 Min | 18 | 22 | 25 |

*Table III*

| Time | Temperature, °C. | | |
|---|---|---|---|
| | 93 | 107 | 117 |
| 5 Min | 63.9 | 54.6 | 50.8 |
| 10 Min | 51.9 | 48.9 | 43.6 |
| 15 Min | 51.0 | 42.8 | 42.3 |

Water absorption tests on similar pulp sheets in which alum was not used were of the order of 79–80%. All sheets exhibited distinctly greater wet strength than similarly formed untreated sheets.

The foregoing results show that when the alum treatment of Example 10 is used satisfactory resistance to ink penetration and water absorption can be achieved with curing temperatures substantially lower than those required when the alum treating step is omitted. The temperatures of Tables II and III are within the range of those normally used in paper making.

EXAMPLE 11

The procedure of Example 10 was followed except that a mixture of organosilicon compounds having different organic radicals was used. The mixture comprised 10 ml. of an aqueous alkaline solution containing 7.72% by weight sodium hydroxide and 3.24% by weight sodium salts of the alkaline hydrolysis products of n-butyl trichlorosilane and 10 ml. of an aqueous alkaline solution containing 6.81% sodium hydroxide and 3.0% sodium salts of the alkaline hydrolysis products of mixed amyl trichlorosilane. The resulting mixture had a pH of 4.5–4.8 and from here on the procedure was identical with that of Example 10. When the foregoing quantities are used, each organosilicon compound is present in the furnish to the extent of about 3%, making a total of 6% active solids in the furnish.

Ink float tests on samples prepared in this manner showed that a mixture of compounds having different organic radicals produces an ink resisting effect greater than that obtained with either compound alone. This surprising result is further brought out in Table IV wherein ink float test values for samples prepared with hydrolysis products containing only one type of organic radical are included for purposes of comparison.

*Table IV*

| Type of Organosilicon Compound | Curing Temperature and Time | | | |
|---|---|---|---|---|
| | Plate Dried, 10 Min. | 125° C., 60 Min. | 150° C., 60 Min. | 175° C., 30 Min. |
| n-Butyl | 15 sec | 30 sec | 2 min | 16 min. |
| Mixed amyl | 15 min | 25 min | 54 min | 95 min. |
| mixture of n-butyl and mixed amyl. | 21 min | 37 min | 95 min | 165 min. |

EXAMPLE 12

A solution containing 2.2% NaOH and 1% soluble organosilicon compounds obtained by the alkaline hydrolysis of amyltrichlorosilane was adjusted to pH 7 with hydrochloric acid. Strips of sized kraft paper and coarse qualitative filter paper were immersed in this solution for thirty minutes, dried, and cured at various temperatures for thirty minutes. Water resistance was improved in every case as indicated by ink penetration tests in the table below:

*Table V*

| Paper | Curing Temperature, °C. | Time of Penetration in Minutes |
|---|---|---|
| Filter Paper | Blank—no treatment | 0 |
| Do | 125 | 2 |
| Do | 150 | 9 |
| Do | 175 | 9 |
| Kraft Paper | Blank—no treatment | 8 |
| Do | 125 | 15 |
| Do | 150 | 30 |
| Do | 175 | 55 |

EXAMPLE 13

A solution containing 2.2% NaOH and 1% soluble organosilicon compounds obtained by the alkaline hydrolysis of amyltrichlorosilane was adjusted to pH 7 with hydrochloric acid. Strips of sized kraft paper and coarse qualitative filter paper were immersed in this solution for thirty minutes, then in a 0.5% alum solution for fifteen minutes, dried, and cured thirty minutes at various temperatures. Water resistance was improved in every case as indicated by ink penetration tests in the table below:

*Table VI*

| Paper | Curing Temperature, °C. | Time of Penetration in Minutes |
|---|---|---|
| Filter Paper | Blank—no treatment | 0. |
| Do | 125 | 7. |
| Do | 150 | 17. |
| Do | 175 | 30. |
| Kraft Paper | Blank—no treatment | 8. |
| Do | 125 | 4. |
| Do | 150 | Over 60. |
| Do | 175 | Over 60. |

EXAMPLE 14

A solution containing 2.2% NaOH and 1% soluble organosilicon compounds obtained by the alkaline hydrolysis of amyltrichlorosilane was adjusted to pH 7 with hydrochloric acid. Strips of sized kraft paper and coarse qualitative filter paper were immersed in this solution for thirty minutes, then in an aqueous alkaline solution of pH 10.5 for thirty minutes and finally in a 0.5% alum solution for fifteen minutes. The papers were then dried and cured for thirty minutes at various temperatures. Water resistance was improved in every case as indicated by ink penetration tests in the table below.

*Table VII*

| Paper | Curing Temperature, °C. | Time of Penetration in Minutes |
|---|---|---|
| Filter Paper | Blank—no treatment | 0. |
| Do | 125 | 15. |
| Do | 150 | Over 60. |
| Do | 175 | Over 60. |
| Kraft Paper | Blank—no treatment | 8. |
| Do | 125 | 45. |
| Do | 150 | 45. |
| Do | 175 | Over 60. |

EXAMPLE 15

The procedure of Example 1 is followed except that the sodium salts of the alkaline hydrolysis products of allyl trichlorosilane are substituted for the hydrolysis products of n-butyl trichlorosilane used in Example 1.

EXAMPLE 16

The procedure of Example 1 is followed except that the sodium salts of the alkaline hydrolysis products of amylphenyl trichlorosilane are substituted for the hydrolysis products of n-butyl trichlorosilane used in Example 1.

From the foregoing description, it is apparent that applicants have provided a useful and practical method of applying an insoluble organosilicon compound to paper-making fibers, either before or after they have been formed into paper. The organosilicon compound is conveniently applied from aqueous solutions thus rendering unnecessary the use of organic solvents. The entire process, including the curing step, may be carried out at temperatures no higher than those presently used in the manufacture of paper, and hence tendering of the fibers as a result of excessive heating is avoided. The product of the process exhibits substantial resistance to ink penetration and improved wet strength.

Since many embodiments might be made of the present invention and since many changes might be made in the embodiment disclosed herein, it is to be understood that the foregoing description is to be interpreted as illustrative only and not in a limiting sense.

What is claimed is:

1. A method of sizing paper to improve such properties as wet strength and water resistance thereof which comprises contacting an organotrihalosilane wherein the organo substituent is selected from the group consisting of n-butyl, mixed amyl, and benzyl radicals with an aqueous alkali while maintaining the concentration of alkali at a sufficiently high value to provide a stable solution of the alkaline hydrolysis products of the organohalosilane, adding an acid to the resulting solution to reduce the pH thereof to about 7, treating said paper with said solution to deposit an insoluble organosilicon compound on the fibers thereof, and drying and heating said paper to an elevated temperature to complete polymerization of said deposited compound.

2. A method according to claim 1 and wherein the organo substituent is an n-butyl radical.

3. A method according to claim 1 and wherein the organo substituent is a mixed amyl radical.

4. A method according to claim 1 and wherein the organo substituent is a benzyl radical.

5. A method according to claim 1 and wherein the paper is treated with an alum solution after treatment with the organosilicon solution and before drying and heating.

CLINTON W. MacMULLEN.
RICHARD C. SHAVER.
ROBERT L. TITUS.

References Cited in the file of this patent

UNITED STATES PATENTS

| Number | Name | Date |
|---|---|---|
| 2,386,259 | Norton | Oct. 9, 1945 |
| 2,439,689 | Hyde | Apr. 13, 1948 |
| 2,449,572 | Welsh | Sept. 21, 1948 |
| 2,507,200 | Elliot et al. | May 9, 1950 |

OTHER REFERENCES

Bass et al., Modern Plastics, November 1944, pages 124–126, 212 and 214.

Bergendahl et al., Paper Trade Journal, September 4, 1947, pages 40–48.